(12) United States Patent
Katsuragi (10) Patent No.: US 10,947,398 B2
(45) Date of Patent: Mar. 16, 2021

(54) WHITE INK, PRINTED MATTER, METHOD OF PRINTING, AND DEVICE FOR PRINTING

(71) Applicant: Koji Katsuragi, Kanagawa (JP)

(72) Inventor: Koji Katsuragi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 83 days.

(21) Appl. No.: 15/494,725

(22) Filed: Apr. 24, 2017

(65) Prior Publication Data

US 2017/0313896 A1    Nov. 2, 2017

(30) Foreign Application Priority Data

May 2, 2016 (JP) .............................. JP2016-092625
Mar. 7, 2017 (JP) .............................. JP2017-042431

(51) Int. Cl.

| C09D 11/107 | (2014.01) |
|---|---|
| C09D 11/102 | (2014.01) |
| C09D 11/10 | (2014.01) |
| C09D 11/108 | (2014.01) |
| C09D 11/30 | (2014.01) |
| B41J 2/21 | (2006.01) |

(52) U.S. Cl.
CPC ............ *C09D 11/107* (2013.01); *C09D 11/10* (2013.01); *C09D 11/102* (2013.01); *C09D 11/108* (2013.01); *C09D 11/30* (2013.01); *B41J 2/2117* (2013.01); *Y10T 428/24802* (2015.01)

(58) Field of Classification Search
CPC ....... C09D 11/30; C09D 11/10; C09D 11/102; C09D 11/107; C09D 11/108; B41J 2/2117; Y10T 428/24802
See application file for complete search history.

(56) References Cited

U.S. PATENT DOCUMENTS

| 2004/0116552 A1* | 6/2004 | Takao ..................... C09D 11/30 523/160 |
|---|---|---|
| 2005/0005818 A1* | 1/2005 | Sato ....................... C09D 11/16 106/31.27 |
| 2008/0206487 A1* | 8/2008 | Ohkubo ............... C09D 11/101 427/595 |
| 2011/0318510 A1* | 12/2011 | Seguchi ................. B41M 5/506 428/32.33 |
| 2013/0194344 A1* | 8/2013 | Yokohama ........... C09D 11/037 347/20 |
| 2013/0225748 A1* | 8/2013 | Jakubek ............... C09D 11/102 524/497 |
| 2015/0258833 A1 | 9/2015 | Katsuragi |
| 2016/0177116 A1 | 6/2016 | Katsuragi et al. |
| 2016/0288535 A1* | 10/2016 | Sumikawa ........... B41J 11/0015 |
| 2017/0166764 A1 | 6/2017 | Katsuragi |
| 2017/0267889 A1 | 9/2017 | Katsuragi |
| 2017/0368819 A1* | 12/2017 | Kagata ................. B41J 2/04563 |

FOREIGN PATENT DOCUMENTS

| JP | 2009-138077 | 6/2009 |
|---|---|---|
| JP | 2014-172248 | 9/2014 |

* cited by examiner

*Primary Examiner* — Lucas A Stelling
*Assistant Examiner* — Sathavaram I Reddy
(74) *Attorney, Agent, or Firm* — Oblon, McClelland, Maier & Neustadt, L.L.P.

(57) ABSTRACT

A white ink includes a hollow resin particle, an organic solvent, an acrylic silicone resin, and water, wherein the acrylic silicone resin has a resin solubility parameter smaller than that of the hollow resin particle.

15 Claims, 1 Drawing Sheet

FIG. 1

FIG. 2

WHITE INK, PRINTED MATTER, METHOD OF PRINTING, AND DEVICE FOR PRINTING

CROSS-REFERENCE TO RELATED APPLICATIONS

This patent application is based on and claims priority pursuant to 35 U.S.C. § 119 to Japanese Patent Application Nos. 2016-092625 and 2017-042431, filed on May 2, 2016 and Mar. 7, 2017, respectively, in the Japan Patent Office, the entire disclosures of which are hereby incorporated by reference herein.

BACKGROUND

Technical Field

The present invention relates to a white ink, printed matter, a method of printing, and a device for printing.

Description of the Related Art

In general, inkjet methods use titanium dioxide as a coloring material for white ink. In addition, white ink using a hollow resin particle including a hollow inner layer is known as a coloring material.

Such a hollow resin particle demonstrates white utilizing the difference of refractive index between the inner layer and the outer crust resin of the hollow resin particle.

Aqueous white ink for inkjet, including a hollow resin particle and a polyurethane resin as components has been developed to obtain white images, wherein the polyurethane resin has a glass transition temperature of 20 degrees C. or lower.

Also, white ink in which titanium oxide and a hollow resin particle are used as a pigment and the pigment is coated with a water-insoluble resin such as an acrylic silicone-based resin to form a capsule pigment has been developed.

SUMMARY

According to the present invention, provided is an improved white ink which includes a hollow resin particle, an organic solvent, an acrylic silicone resin, and water, wherein the acrylic silicone resin has a resin solubility parameter smaller than that of the hollow resin particle

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc. in the present disclosure represent the same meaning, unless otherwise specified.

The present inventor has found that a target luminosity can be demonstrated on a substrate having a low smoothness with a white ink including a hollow resin particle, an organic solvent, an acrylic silicone resin, and water when the resin solubility parameter of the hollow resin particle is smaller than the resin solubility parameter of the acrylic silicone resin. Thus, the present invention was made.

The present disclosure relates to the white ink of the following 1 and also includes the following 2 to 10 as embodiments.

1. A white ink including a hollow resin particle, an organic solvent, an acrylic silicone resin, and water, wherein the resin solubility parameter (SP) of the acrylic silicone resin is smaller than that of the resin solubility parameter of the hollow resin particle.
2. The white ink according to 1 mentioned above, wherein the resin solubility parameter of the hollow resin particle and the resin solubility parameter of the acrylic silicone resin have a difference of 1 to 3 $(cal/cm^3)^{0.5}$.
3. The white ink according to 1 or 2 mentioned above, wherein the acrylic silicone resin has a glass transition temperature of 30 degrees C. or higher.
4. The white ink according to any one of 1 to 3 mentioned above, wherein the resin solubility parameter of the hollow resin particle is 9 to 11 $(cal/cm^3)^{0.5}$.
5. The white ink according to any one of 1 to 4 mentioned above, wherein the resin solubility parameter of the acrylic silicone resin is 8 to 10 $(cal/cm^3)^{0.5}$.
6. The white ink according to any one of 1 to 5 mentioned above, wherein the hollow resin particle includes one of a copolymer of styrene and acrylic, a methylmethacrylate resin, and a phenol resin.
7. The white ink according to any one of 1 to 6 mentioned above, wherein the white ink has a luminosity of L* or higher at an attached amount of the white ink on a substrate of 2.1 $mg/cm^2$, where L* is represented by the following relation:

$$L^* = 0.2 \times \text{smoothness (sec) of the substrate} + 50,$$

wherein the smoothness is measured by an Oken smoothness tester.

8. Printed matter including a substrate having a smoothness of 120 seconds or less, measured by an Oken smoothness tester; and a white printed layer including a hollow resin particle, an organic solvent, and acrylic silicone resin, wherein the resin solubility parameter of the acrylic silicone resin is smaller than the resin solubility parameter of the hollow resin particle, and wherein the hollow resin particle has a permeation depth of 1 to 25 μm to the substrate.

9. A method of printing including applying a white ink to a substrate, the white ink including a hollow resin particle, an organic solvent, an acrylic silicone resin, and water, wherein the acrylic silicone resin has a resin solubility parameter smaller than the hollow resin particle.

10. The method according to 9 mentioned above, wherein the substrate has a smoothness of 120 seconds or less, measured by an Oken smoothness tester.

11. A device for printing including a white ink and an ink discharging head configured to discharge an ink including the white ink, wherein the white ink includes a hollow resin particle, an organic solvent, an acrylic silicone resin, and water and wherein the resin solubility parameter of the acrylic silicone resin is smaller than the resin solubility parameter of the hollow resin particle.

The white ink of the present disclosure includes a hollow resin particle, an organic solvent, an acrylic silicone resin, and water.

The resin solubility parameter (SP) of the acrylic silicone resin is smaller than the resin solubility parameter of the hollow resin particle. When the resin SP of the acrylic silicone resin is smaller than the resin SP of the hollow resin particle, the acrylic silicone resin having a smaller resin SP preferentially permeates into a substrate in comparison with the hollow resin particle having a larger resin SP. The hollow resin particle receives repulsion due to the difference of the resin SP between the hollow resin particle receives repulsion and the acrylic silicone resin and the silicone contained in the acrylic silicone resin. As a consequence, the hollow resin particle is prevented from permeating into a substrate, so that a target luminosity is demonstrated.

The luminosity when the attached amount of the ink to the substrate is 2.1 mg/cm$^2$ is L* or greater. L* is represented by the following relation.

$$L^* = 0.2 \times \text{smoothness (sec) of substrate} + 50.$$

The smoothness is measured by an Oken smoothness tester. The unit is second.

The difference between the resin SP of the hollow resin particle and the resin SP of the acrylic silicone resin is 0.9 to 3.1 $(cal/cm^{3.1})^{0.5}$.

The difference is preferably 1 to 3 $(cal/cm^{3.1})^{0.5}$ and more preferably 1 to 2 $(cal/cm^{3.1})^{0.5}$. When the difference is 1 $(cal/cm^{3.1})(^{0.5}$ or greater, both the hollow resin particle and the acrylic silicone resin can be made repulsive to each other on a substrate. When the difference is 3 $(cal/cm^{3.1})^{0.5}$ or less, solubility of the resins in the white ink is secured. Two or more kinds of acrylic silicone resins can be added to the white ink. In such a case, the resin SP of the acrylic silicone resin having a large content is used to determine whether the resin SP is within the range specified above.

The unit of the resin SP in the present disclosure is $(cal/cm^{3.1})^{0.5}$. Hereinafter, the unit of the resin SP is omitted.

Ink

The organic solvent, water, the coloring material, the hollow resin particle, resins, additives, etc. for use in the ink are described next.

Moreover, the ink preferably includes wax.

Organic Solvent

The SP of a liquid mixture of the organic solvent and water in the ink for use in the present disclosure is preferably 17.0 to 20.2. The SP of the organic solvent which is added most in the ink is preferably 11.0 to 17.4. When the SP of the liquid mixture of the organic solvent(s) and water is 17.0 or greater or the SP of the organic solvent added most is 11.0 or greater, it is possible to suppress solution of the hollow resin particle in the organic solvent(s). When the SP of the liquid mixture of the organic solvent(s) and water is 20.2 or less or the SP of the organic solvent added most is 17.4 or less, it is possible to suppress deterioration of the fixability ascribable to poor drying.

The SP of the liquid mixture of the organic solvent and water in an ink is calculated according to the following relation.

$SP$ $(cal/cm^3)^{0.5}$ in liquid mixture of organic solvent and water in ink=[$SP$ of organic solvent $A$×volume ratio of organic solvent $A$]+[$SP$ of organic solvent $B$×volume ratio of organic solvent $B$)+ . . . +[$SP$ of water×volume ratio of water]

In addition, although the organic solvent for use in the present disclosure includes articles classified as permeating agents, defoaming agents, etc. in terms of functionality, only the organic solvent accounting for 3 percent by mass or more of the ink is counted in the above-mentioned calculation of the SP. Examples of the organic solvent are polyols, ethers such as polyol alkylethers and polyol arylethers, nitrogen-containing heterocyclic compounds, amides, amines, and sulfur-containing compounds.

Specific examples of the organic solvent include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1, 3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenyl ether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, E-caprolactam, and $_7$-butyrolactone; amides such as formamide, N-methylformamide, N,N-dimethylformamide, 3-methoxy-N,N-dimethyl propioneamide, and 3-buthoxy-N,N-dimethyl propioneamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

In addition, when the hydrogen bond term in the solubility parameter of Hansen is 3 to 6.8 $(cal/cm^3)^{0.5}$ and the boiling point of the organic solvents is 150 to 300 degrees C., fixability is improved, which is preferable.

The hydrogen bond term can be obtained according to the atomic group aggregation method of treating organic molecules as atomic groups, which is proposed by Krevelen (Krevelen, Properties of Polymer, Second edition, New York, 154 (1976).

Examples of the organic solvents satisfying the conditions mentioned above are glycerin, 1,2-propanediol, 1,3-propanediol, 1,2-butanediol, 1,3-butanediol, isoprene glycol, and oxetane compounds, which are particularly preferable.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance permeability of ink when paper is used as a print medium (recording medium).

The proportion of the organic solvent in ink has no particular limit and can be suitably selected to suit to a particular application.

In terms of the drying property and discharging reliability of the ink, the proportion is preferably 10-60 percent by mass and more preferably 20-60 percent by mass.

Water

The proportion of water in the ink has no particular limit. In terms of the drying property and discharging reliability of the ink, the proportion is preferably from 10 to 90 percent by mass and more preferably from 20 to 60 percent by mass.

Hollow Resin Particle

The hollow resin particle for use in the present disclosure has a structure in which the inner layer is hollow and the outer crust is formed of a resin. The hollow resin particles individually have an outer diameter of from about 0.1 to about 1 μm and an inner diameter of from about 0.05 to about 0.8 μm.

Since the inner layer is hollow, specific gravity as ink is about 1 so that, unlike titanium dioxide, the ink does not precipitate over time. In order to avoid precipitation over time, it is preferable that the thickness of the outer crust resin of the hollow resin particle be 10 to 20 percent to the size of the entire hollow resin particle.

When the resin SP of the hollow resin particle is preferably from 9 to 11 and more preferably from 9 to 10. When the resin SP of the hollow resin particle is 9 or greater, dispersibility in water can be maintained. When the resin SP is 11 or less, it is possible to prevent the resin component from being dissolved in the organic solvent for use in the present disclosure.

The resin SP of the hollow resin particle is obtained by cloud titration method. In this method, a resin sample is dried by heating and thereafter dissolved in acetone to prepare a polymer solution. To the polymer solution, n-hexane and water as poor solvents were dripped. The amount of the poor solvent required until cloud occurs is measured. The SP is calculated according to the relation 1 below (refer to K. W. Suh, J. M. Corbett: J. Apply polym. Sci., 12 [10]. pp 2,359 to 2,370 published in 1968).

$$\delta_R = (V_D^{1/2} \cdot \delta_D + V_H^{1/2} \delta_H)/(V_D^{1/2} + V_H^{1/2}) \qquad \text{Relation 1}$$

$\delta_R$=SP of resin (cal/cm$^3$)$^{1/2}$
$\delta_R$=SP of deionized water (cal/cm$^3$)$^{1/2}$
$\delta_H$=SP of n-hexane (cal/cm$^3$)$^{1/2}$
$V_D$=volume ratio of deionized water
$V_H$=volume ratio of n-hexane The cloud titration is conducted in the following manner. 0.5 g of a dried resin composition (solid) is dissolved in 10 ml of acetone. n-hexane is added to the solution and the titration amount H (ml) at the cloud point is measured. Similarly, deionized water is added to the acetone solution and the titration amount D (ml) at the cloud point is measured. These are applied to the following relation to calculate $V_H$, $V_D$, $\delta_D$, and $\delta_H$.

The SPs of acetone, n-hexane, and deionized water are respectively, 9.75, 7.24, and 23.43.

$$V_H = H/(10+H)$$

$$\delta_D = D/(10+D)$$

$$\delta_D = 9.75 \times 10/(10+H) + 7.24 \times H/(10+H)$$

$$\delta_H = 9.75 \times 10/(10+D) + 23.43 \times D/(10+D)$$

It is preferable to use a styrene-acrylic copolymer resin, a methylmethacrylate resin, or a phenol resin as the hollow resin particle in terms of the air layer of the inner layer and refractive index. In addition, taking into account drying ascribable to heat, it is suitable to change to a thermoplastic resin.

The proportion of the hollow resin particle in the ink is preferably 5 to 12.5 percent by mass and more preferably 8.5 to 10 percent by mass in terms of enhancement of luminosity.

Preparation methods of the hollow resin particles are not particularly limited and known methods can be applied to the preparation. As the preparation method of the hollow resin particle, it is possible to employ the so-called emulsion polymerization method in which, for example, vinyl monomers, surfactants, polymerization initiators, and aqueous dispersion medium are stirred while being heated in nitrogen atmosphere to form a hollow resin particle emulsion.

An example of the vinyl monomer is non-ionic monoethylene unsaturated monomer.

Specific examples include, but are not limited to, styrene, vinyl toluene, ethylene, vinylacetate, vinyl chloride, vinylidene chloride, acrylonitrile, (meth)acrylamide, and (meth)acrylate.

Specific examples of the (meth)acrylate include, but are not limited to, methylacrylate, methylmethacrylate, ethyl (meth)acrylate, butyl(meth)acrylate, 2-hydroxyethylmethacrylate, 2-ethylhexyl(meth)acrylate, benzyl(meth)acrylate, lauryl(meth)acrylate, oleyl(meth)acrylate, palmityl(meth) acrylate, and stearyl(meth)acrylate.

In addition, it is possible to use a di-functional vinyl monomer as the vinyl monomer. As the di-functional monomer, specific examples include, but are not limited to, divinylbenzene, aryl methacrylate, ethyleneglycol dimethacrylate, 1,5-butane diol dimethacrylate, diethyleneglyco dimethacrylate, trimethylol propane trimethacrylate. The mono-functional vinyl monomer mentioned above and the di-functional vinyl monomer mentioned above are copolymerized for high level cross linking, so that a hollow resin particle having good light scattering property, heat resistance, chemical resistance, and solvent dispersibility is obtained.

As the surfactant, articles forming molecule aggregation such as micelle in water are suitable. Examples are anionic surfactants, non-ionic surfactants, cationic surfactants, and amphoteric surfactants.

As the polymerization initiator, known water-soluble compounds are usable. Examples are hydrogen peroxide and potassium persulfate.

Examples of aqueous solvent medium are water and water containing a hydrophilic organic solvent.

Coloring Material

The coloring material has no particular limit. For example, pigments and dyes are suitable.

As the pigment (first pigment and second pigment), both inorganic pigments and organic pigments can be used. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium oxide, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rohdamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The type of dye is not particularly limited and includes, for example, acidic dyes, direct dyes, reactive dyes, basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.1. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in the ink is preferably 0.1-15 percent by mass and more preferably 1-10 percent by mass in terms of enhancement of image density, fixability, and discharging stability.

To disperse a pigment in the ink, for example, a hydrophilic functional group is introduced into the pigment to prepare a self-dispersible pigment, the surface of the pigment is coated with a resin, or a dispersant is used to disperse the pigment.

As a method of introducing a hydrophilic functional group into a pigment to prepare a self-dispersible pigment, it is possible to use, for example, a self-dispersion pigment, etc. in which a functional group such as a sulfone group and a carboxyl group is added to a pigment (e.g., carbon) to make it dispersible in water.

To coat the surface of the pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin may be dispersed in the ink unless the pigments have an adverse impact.

In a method of using a dispersant to disperse a pigment, for example, a known dispersant of a small molecular weight or a large molecular weight, which is represented by a surfactant, is used to disperse the pigment in ink.

As the dispersant, it is possible to select, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

A coloring material may be mixed with materials such as water and an organic solvent to obtain ink. It is also possible to mix a pigment with water, a dispersant, etc., first to prepare a pigment dispersion and thereafter mix the pigment dispersion with materials such as water and organic solvent to manufacture ink.

The pigment dispersion can be obtained by dispersing water, a pigment, a pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably from 20 to 500 nm and more preferably from 20 to 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably 0.1-50 percent by mass and more preferably 0.1-30 percent by mass.

It is preferable that the pigment dispersion be filtered with a filter, a centrifuge, etc. to remove coarse particles and thereafter degassed.

Resin

Acrylic silicone-based resins are used as the resin in the ink. It is possible to mix a resin emulsion in which the resin is dispersed in water serving as a dispersion medium with materials such as a coloring material and an organic solvent to obtain ink. It is possible to use suitably synthesized resins or products available on the market as the resin. These can be used alone or in combination.

The resin SP of the acrylic silicone resin is 7.9 to 10.1.

The resin SP is preferably 8 to 10 seconds and more preferably 8 to 9. When the resin SP of the acrylic silicone resin is 8 or greater, dispersability to water can be maintained. When the resin SP is 10 or less, it is possible to preferentially permeate the acrylic silicone resin into a substrate in comparison with the hollow resin particle. The resin SP can be controlled by the amount of the functional group in the resin and the resin SP of the acrylic silicone resin is measured according to cloud titration method like the resin SP of the hollow resin particle.

The glass transition temperature of the acrylic silicone resin is preferably 30 to 60 degrees C. and more preferably 30 to 50 degrees C. When the glass transition temperature of the acrylic silicone resin is set to 30 degrees C. or higher, the resin can relatively maintain a spherical form in a room temperature environment so that permeation into a substrate is not easily inhibited. When the glass transition temperature of the acrylic silicone resin is set to 60 degrees C. or lower, the resin can relatively maintain a spherical form even in a drying process so that permeation into a substrate is not easily inhibited.

The volume average particle diameter of the resin particle is not particularly limited and can be suitably selected to suit to a particular application. The volume average particle diameter is preferably 50 to 200 nm and more preferably 50 to 150 nm.

The volume average particle diameter can be measured by using, for example, a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably 1-30 percent by mass and more preferably 5-20 percent by mass to the total content of the ink.

The particle diameter of the solid portion in ink is not particularly limited and can be suitably selected to suit to a particular application. For example, the maximum frequency in the number conversion is preferably 20 to 1,000 nm and more preferably 20 to 800 nm to ameliorate the discharging stability and the image quality such as image density. The solid portion includes resin particles, particles of pigments, etc. The particle diameter can be measured by using a particle size analyzer (Nanotrac Wave-UT151, manufactured by MicrotracBEL Corp).

Wax

It is preferable to add wax to the ink of the present disclosure to impart slippage to image portions.

Of the wax, polyethylene-based wax emulsion or carnauba wax is preferable in terms of film formation property and slippage in particular when an ink is applied to an image forming portion.

The melting point of the wax is preferably 80 to 140 degrees C. and more preferably 100 to 140 degrees C. When the melting point is 80 degrees C. or higher, wax does not excessively melt or coagulate, so that storage stability of the ink is maintained. When the melting point is 140 degrees C. or lower, wax melts sufficiently in room temperature environment, so that slippage is imparted to the ink.

The particle diameter of the wax is preferably 0.01 μm or greater and more preferably 0.01 to 0.1 μm. When the particle diameter is 0.01 μm or greater, wax particles tend to be oriented to the surface of an ink, thereby imparting slippage to the ink.

As an example of the polyethylene-based wax, products available on the market such as High-Tech series, manufactured by TOHO Chemical Industry Co., Ltd. and AQUACER SERIES, manufactured by BYK are suitable.

As the carnauba wax, for example, products available on the market such as Selosol 524 and Trasol (both manufactured by CHUKYO YUSHI CO., LTD.) are suitable.

The proportion of the wax is preferably 1 to 10 percent by mass and more preferably 1 to 5 percent by mass.

Additive Agent

Ink may further optionally contain a surfactant, a defoaming agent, a preservative and fungicide, a corrosion inhibitor, a pH regulator, etc.

Surfactant

Examples of the surfactant are silicone-based surfactants, fluorochemical surfactants, amphoteric surfactants, nonionic surfactants, anionic surfactants, etc.

The silicone-based surfactant has no specific limit and can be suitably selected to suit to a particular application. Of these, preferred are silicone-based surfactants which are not decomposed even in a high pH environment.

Specific examples thereof include, but are not limited to, side-chain-modified polydimethylsiloxane, both-distal end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group is particularly preferable because such an agent demonstrates good characteristics as an aqueous surfactant. It is possible to use a polyether-modified silicone-based surfactant as the silicone-based surfactant. An example is a compound in which a polyalkylene oxide structure is introduced into the side chain of the Si site of dimethyl silooxane.

Specific examples of the fluorochemical surfactants include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because they do not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain.

Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants has no particular limit and can be suitably selected to suit to a particular application.

Specific examples thereof include, but are not limited to, side-chain-modified polydimethyl siloxane, both distal-end-modified polydimethylsiloxane, one-distal-end-modified polydimethylsiloxane, and side-chain-both-distal-end-modified polydimethylsiloxane. In particular, a polyether-modified silicone-based surfactant having a polyoxyethylene group or a polyoxyethylene polyoxypropylene group is particularly preferable because such a surfactant demonstrates good characteristics as an aqueous surfactant.

Any suitably synthesized surfactant and any product thereof available on the market is suitable. Products available on the market can be obtained from Byc Chemie Japan Co., Ltd., Shin-Etsu Silicone Co., Ltd., Dow Corning Toray Co., Ltd., etc., NIHON EMULSION Co., Ltd., Kyoeisha Chemical Co., Ltd., etc.

The polyether-modified silicon-containing surfactant has no particular limit and can be suitably selected to suit to a particular application. For example, a compound is usable in which the polyalkylene oxide structure represented by the following Chemical formula S-1 is introduced into the side chain of the Si site of dimethyl polysiloxane.

Chemical formula S-1

In the Chemical formula S-1, "m", "n", "a", and "b" each, respectively represent integers, R represents an alkylene group, and R' represents an alkyl group.

Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Co., Ltd.), BYK-33 and BYK-387 (both manufactured by BYK Japan KK.), and TSF4440, TSF4452, and TSF4453 (all manufactured by Momentive Performance Materials Inc.).

A fluorochemical surfactant in which the number of carbon atoms replaced with fluorine atoms is 2-16 is preferable and, 4 to 16, more preferable.

Specific examples of the fluorochemical surfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain. Of these, polyoxyalkylene ether polymer compounds having a perfluoroalkyl ether group in its side chain are preferable because they do not foam easily and the fluorosurfactant represented by the following Chemical formula F-1 or Chemical formula F-2 is more preferable.

Chemical formula F-1

In the Chemical formula F-1, "m" is preferably 0 or an integer of from 1 to 10 and "n" is preferably 0 or an integer of from 1 to 40.

Chemical formula F-2

In the compound represented by the chemical formula F-2, Y represents H or $C_mF_{2m+1}$, where m represents an integer of 1-6, or $CH_2CH(OH)CH_2$—$C_mF_{2m+1}$, where m represents an integer of 4-6, or $C_pH_{2p+1}$, where p is an integer of 1-19, n represents an integer of from 1 to 6. "a" represents an integer of 4-14.

As the fluorochemical surfactant, products available on the market may be used.

Specific examples include, but are not limited to, SURFLON S-111, SURFLON S-112, SURFLON S-121, SURFLON S-131, SURFLON S-132, SURFLON S-141, and SURFLON S-145 (all manufactured by ASAHI GLASS CO., LTD.); FLUORAD FC-93, FC-95, FC-98, FC-129, FC-135, FC-170C, FC-430, and FC-431 (all manufactured by SUMITOMO 3M); MEGAFACE F-470, F-1405, and F-474 (all manufactured by DIC CORPORATION); ZONYL TBS, FSP, FSA, FSN-100, FSN, FSO-100, FSO, FS-300, UR, and Capstone™ FS-30, FS-31, FS-3100, FS-34, and FS-35 (all manufactured by The Chemours Company); FT-110, FT-250, FT-251, FT-400S, FT-150, and FT-400SW (all manufactured by NEOS COMPANY LIMITED); POLYFOX PF-136A, PF-156A, PF-151N, PF-154, and PF-159 (manufactured by OMNOVA SOLUTIONS INC.); and UNIDYNE™ DSN-403N (manufactured by DAIKIN INDUSTRIES, Ltd.). Of these, in terms of improvement on print quality, in particular coloring property and permeability, wettability, and uniform dying property on paper, FS-3100, FS-34, and FS-300 of The Chemours Company, FT-110, FT-250, FT-251, FT-400S, FT-150, and FT-400SW of NEOS COMPANY LIMITED, POLYFOX PF-151N of OMNOVA SOLUTIONS INC., and UNIDYNE™ DSN-403N (manufactured by DAIKIN INDUSTRIES, Ltd.) are particularly preferable.

The proportion of the surfactant in ink is not particularly limited and can be suitably selected to suit to a particular application. It is preferably 0.001-5 percent by mass and more preferably 0.05-5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of breaking foams.

Preservatives and Fungicides

The preservatives and fungicides are not particularly limited. A specific example is 1,2-benzisothiazoline-3-on.

Corrosion Inhibitor

The corrosion inhibitor has not particular limitation. Examples are acid sulfite and sodium thiosulfate.

pH Regulator

The pH regulator has no particular limit. It is preferable to adjust the pH to 7 or higher. Specific examples thereof include, but are not limited to, amines such as diethanol amine and triethanol amine.

The property of the ink is not particularly limited and can be suitably selected to suit to a particular application. For example, viscosity, surface tension, pH, etc, are preferable in the following ranges.

The viscosity of the ink at 25 degrees C. is preferably 5-30 mPa·s and more preferably 5-25 mPa·s to improve print density and text quality and obtain good dischargeability. Viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The surface tension of the ink is preferably 35 mN/m or less and more preferably 32 mN/m or less at 25 degrees C. in terms that the ink is suitably levelized on a recording medium and the drying time of the ink is shortened.

The pH of the ink is preferably 7-12 and more preferably 8-11 in terms of prevention of corrosion of metal materials including the ink.

The pre-processing fluid includes a flocculant, an organic solvent, water, and optional materials such as a surfactant, a defoaming agent, a pH regulator, a preservatives and fungicides and a corrosion inhibitor.

The organic solvent, the surfactant, the defoaming agent, the pH regulator, the preservatives and fungicides, and the corrosion inhibitor can be the same material as those for use in the ink.

Also, other materials for use in known processing fluid can be used.

The type of the flocculant is not particularly limited. For example, water-soluble cationic polymers, acids, and multivalent metal salts are suitable.

Processing Fluid

The post-processing fluid has no particular limit. It is preferable that the post-processing fluid can form a transparent layer. Materials such as organic solvents, water, resins, surfactants, defoaming agents, pH regulators, preservatives and fungicides, corrosion inhibitors, etc. are suitably selected based on a necessity basis and mixed to obtain the post-processing fluid. The post-processing fluid can be applied to the entire recording area formed on a recording medium or only the area on which an ink image is formed.

Recording Medium

Examples of the recording medium (print medium) for recording are plain paper, gloss paper, special paper, cloth, printing paper for general purpose. In the present disclosure, the white ink of the present disclosure is excellent particularly for a substrate having a smoothness of 120 seconds or lower as measured by an Oken smoothness tester (manufactured by ASAHI SEIKO CO., LTD.).

Printed Matter

The printed matter of the present disclosure includes a white printed layer on a substrate. It is preferable to use a substrate having a smoothness of 120 seconds or less as measured by an Oken smoothness tester. The white printed layer includes a hollow resin particle, an organic solvent, and acrylic silicone resin. In addition, the SP of the acrylic silicone resin is smaller than the resin SP of the hollow resin particle. Moreover, the hollow resin particle has a permeation depth of 1 to 25 μm to the substrate.

The permeation depth of the hollow resin particle to a substrate is preferably 1 to 25 μm in order that high luminosity is obtained and the hollow resin particle is fixed onto the substrate to prevent detachment from the printed layer.

The printed matter of the present disclosure includes a print medium and an image formed on the print medium with the ink of the present disclosure.

An inkjet printing device and an inkjet printing method are utilized to print the image on the print medium to obtain the printed matter.

Device for Printing and Method for Printing

Image forming, recording, printing, etc. in the present disclosure have the same meaning. Moreover, recording media, media, substrates in the present disclosure have the same meaning.

The ink of the present disclosure can be suitably applied to various recording devices employing an inkjet recording method, such as printers, facsimile machines, photocopiers, multifunction peripherals (serving as a printer, a facsimile machine, and a photocopier), and 3D model manufacturing devices (3D printers, additive manufacturing device, etc.).

In the present disclosure, the device for printing and the recording method respectively represent a device capable of discharging ink, various processing fluids, etc. to a recording medium and a method of conducting recording on the recording medium utilizing the device. The recording medium means an article to which ink or various processing fluids can be attached at least temporarily.

The recording device may further optionally include a device relating to feeding, conveying, and ejecting the recording medium and other devices referred to as a pre-processing device, a post-processing device, etc. in addition to the head portion to discharge the ink.

The recording device and the recording method may further optionally include a heater for use in the heating process and a drier for use in the drying process. For example, the heating device and the drying device include devices including heating and drying the print surface of a recording medium and the opposite surface thereof. The heating device and the drying device are not particularly limited. For example, a fan heater and an infra-red heater can be used. Heating and drying can be conducted before, in the middle of, and after printing. The heating temperature is preferably 70 to 150 degrees C. and more preferably 70 to 100 degrees C. The heating time is preferably 5 to 60 seconds and more preferably 5 to 30 seconds.

In addition, the recording device and the recording method are not limited to those producing meaningful visible images such as texts and figures with the ink. For example, the recording device and the recording method can produce patterns like geometric design and 3D images.

In addition, the recording device includes both a serial type device in which the liquid discharging head is caused to move and a line type device in which the liquid discharging head is not moved, unless otherwise specified.

Furthermore, in addition to the desktop type, this recording device includes a wide device capable of printing images on a large recording medium such as A0 and a continuous printer capable of using continuous paper wound up in a roll form as recording media.

Figure 1:
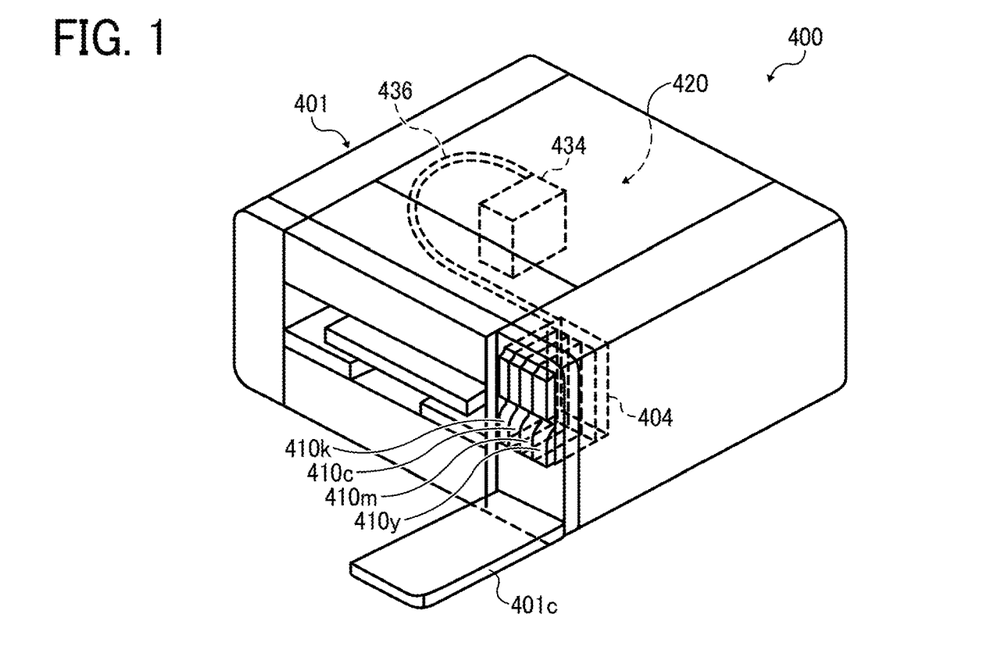
FIG. 1 is a diagram illustrating a side view of an example of the device for printing utilizing the white ink according to an embodiment of the present disclosure.
Figure 2:
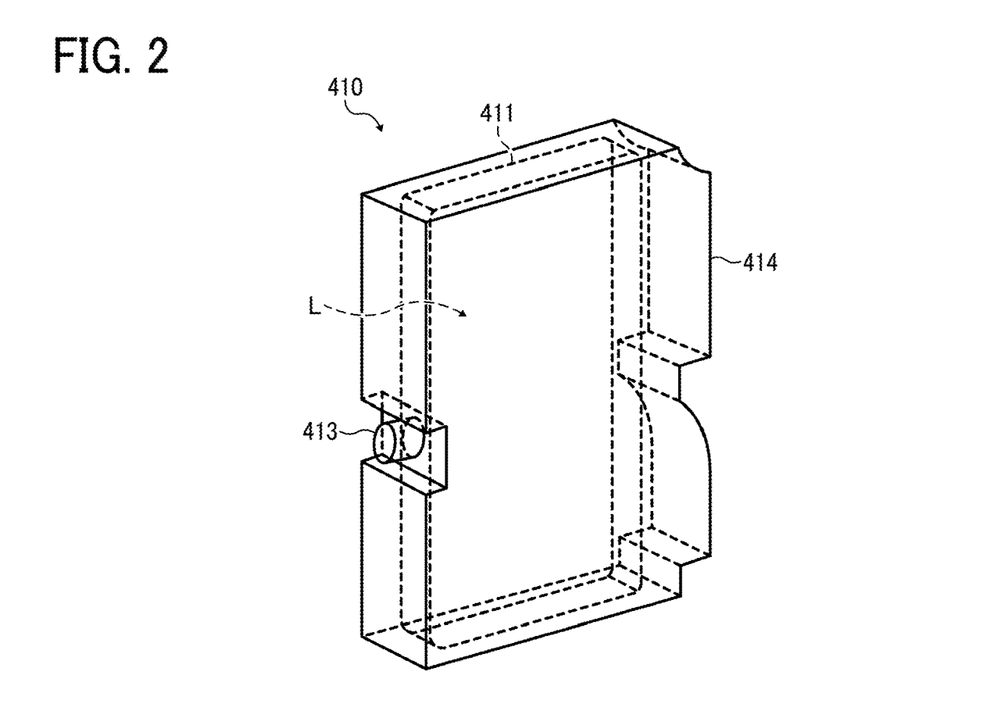
FIG. 2 is a diagram illustrating a perspective view of the main tank illustrated in FIG. 1.

The device for printing (recording device) of the present disclosure is described using an example with reference to FIG. 1 and FIG. 2. FIG. 1 is a perspective view of the recording device. FIG. 2 is a diagram illustrating a perspective view of the main tank. An image forming apparatus 400 as an example of the printing device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packaging member L such as aluminum laminate film. The ink accommodating unit 411 is accommodated in, for example, a plastic housing unit 414. As a result, the main tank 410 is used as an ink cartridge of each color.

The white ink of the present disclosure can be recorded by utilizing a configuration having five main tanks 410 (410k, 410c, 410m, 410y, and 410w) or a configuration having the main tank 410w instead of any of 410k, 410c, 410m, and 410y. The configuration is not limited thereto. The main tank 410 (410w) can be singly used.

A cartridge holder 404 is disposed on the rear side of the opening when a cover 401c is opened. The cartridge holder 404 is detachably attached to the main tank 410. As a result, each ink discharging outlet 413 of the main tank 410 communicates with a discharging head 434 for each color via a supplying tube 436 for each color so that the ink can be discharged from the discharging head 434 to a recording medium.

This recording device may include not only a portion to discharge ink but also a device referred to as a pre-processing device, a post-processing device, etc.

As an example of the pre-processing device and the post-processing device, as in the case of the ink such as black (K), cyan (C), magenta (M), and yellow (Y), the pre-processing device and the post-processing device may further include a liquid accommodating unit including a pre-processing fluid and/or a post-processing fluid to discharge the pre-processing fluid and/or the post-processing fluid according to an inkjet printing method.

As another example of the pre-processing device and the post-processing device, it is suitable to dispose a pre-processing device and a post-processing device which do not employ the inkjet printing method but a blade coating method, a roll coating method, or a spray coating method.

How to use the ink is not limited to the inkjet printing method. Specific examples of such methods other than the inkjet printing method include, but are not limited to, blade coating methods, gravure coating methods, bar coating methods, roll coating methods, dip coating methods, curtain coating methods, slide coating methods, die coating methods, and spray coating methods.

The applications of the ink of the present disclosure are not particularly limited and can be suitably selected to suit to a particular application. For example, the ink can be used for printed matter, a paint, a coating material, and foundation. The ink can be used to form two-dimensional texts and images and furthermore a three-dimensional solid object (3D modeling object) as a material for 3D modeling.

An apparatus for fabricating a three-dimensional object can be any known device with no particular limit. For example, the apparatus includes an ink container, a supplying device, and a discharging device, a drier, etc. The three-dimensional solid object includes an object manufactured by repeating coating with ink. In addition, the three-dimensional solid object can be manufactured by processing a structure having a substrate such as a print medium printed with the ink as a molded processed product. The molded processed product is fabricated from printed matter or a structure having a sheet-like form, film-like form, etc. by, for example, heating drawing or punching.

The molded processed product is suitably used for articles which are molded after surface-decorating. Examples thereof are gauges or operation panels of vehicles, office machines, electric and electronic devices, cameras, etc.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples but not limited thereto.

Preparation of Hollow Resin Particle 726 g of deionized water, 5 g of methylmethacrylate, and 0.1 g of methacrylic acid were placed, stirred, and heated in a four-neck separable flask equipped with a stirrer, a thermometer, a condenser, and a dripping funnel. When the internal temperature of the separable flask reached 70 degrees C., 1 g of 10 percent ammonium persulfate solution was added and the system was heated at 80 degrees C. for 20 minutes. 141 g of methyl methacrylate, 94.9 g of methacrylic acid, 5 g of alkylbenzene sodium sulfonate (Neogen SF-20, manufactured by DKS Co. Ltd.), and 120 g of deionized water were emulsified by a homo disperser to prepare a pre-emulsion. Thereafter, the pre-emulsion was charged in the dripping funnel.

Next, while keeping the internal temperature of the separable flask at 80 degrees C., the thus-prepared pre-emulsion was uniformly dripped in three hours and at the same time, 10 g of 10 percent ammonium persulfate were uniformly dripped in three hours. Subsequent to completion of the dripping, the resultant was aged at 80 degrees C. for three hours followed by cooling-down and filtrated by a filter with 120 mesh to obtain a seed particle emulsion.

188.2 g of deionized water was placed in the separable flask and 66 g of the thus-obtained seed particle emulsion were added thereto. The system was heated to 80 degrees C. while being stirred. 2.4 g of butylacrylate, 1.1 g of butylmethacrylate, 19.5 g of methylmethacrylate, 0.7 g of methacrylic acid, 0.1 g of alkylbenzene sodium sulfolane (Neogen SF-20, manufactured by DKS Co., Ltd.), and 55.3 g of deionized water were emulsified by a homo disperser to prepare a pre-emulsion 1. Thereafter, the pre-emulsion 1 was charged in the dripping funnel. Next, while keeping the internal temperature of the separable flask at 80 degrees C., the thus-prepared pre-emulsion 1 was uniformly dripped in 30 minutes and at the same time, 1.2 g of 10 percent sodium persulfate were uniformly dripped in 30 minutes.

128.3 g of styrene, 0.6 g of alkylbenzene sodium sulfonate (Neogen SF-20, manufactured by DKS Co. Ltd.), and 51.8 g of deionized water were emulsified by a homo disperser to prepare a pre-emulsion 2. Thereafter, the pre-emulsion 2 was charged in the dripping funnel. One hour after the completion of the dripping of the pre-emulsion 1, the thus-prepared pre-emulsion 2 was uniformly dripped in 60 minutes and at the same time, 3.5 g of 10 percent sodium persulfate were uniformly dripped in 60 minutes while keeping the internal temperature of the separable flask at 80 degrees C. After the completion of the dripping of the pre-emulsion 2, the resultant was aged at 80 degrees C. for one hour. Subsequent to cooling down, the resultant was filtrated by a filter with 120 mesh to obtain a styrene-acrylic emulsion (hollow resin particle A).

A hollow resin particle B was obtained in the same manner as in the case of the hollow resin particle A except that styrene was replaced with methylmethacrylate. In addition, a hollow resin particle C was obtained in the same manner as in the case of the hollow resin particle A except that styrene was replaced with a phenol resin (HARIPHENOL 512, manufactured by Harima Chemicals Group, Inc.).

In addition, as the hollow resin particle Z, a styrene acrylic copolymer (ROPAQUE ULTRA E, SP: 8.0, manufactured by The Dow Chemical Company) was used.

Resin SP of Hollow Resin Particle

After the thus-obtained hollow resin particle sample was dried in a constant temperature tank at 23 degrees C. and a humidity of 10 percent for 24 hours, the sample was dissolved in 10 ml of acetone to prepare a polymer solution. This polymer solution was separately titrated with n-hexane and water and the amount required until cloud occurred was calculated to obtain a resin SP.

Each ink component used to prepare inks of Examples and Comparative Examples is shown in Table 1.

were uniformly mixed and stirred for one hour. Next, the resin and the wax were added followed by stirring for one hour so that the system was uniformly mixed.

Thereafter, the hollow resin particle was added followed by stirring for one hour so that the system was uniformly mixed. The thus-obtained mixture was filtrated with a polyvinylidene fluoride membrane filter having an average hole diameter of 5 μm under pressure to remove coarse particles and dust. Thus, the inks of Examples 1 to 10 and Comparative Examples 1 to 6 were obtained.

Printing Method

The ink shown in Table 2 was discharged by a liquid discharging device (IPSiO GXe5500, manufactured by Ricoh Company Ltd.) to a substrate (TANT N-1, smoothness=3 seconds, manufactured by TAKEO Co., Ltd., Plike black, smoothness: 117 seconds, manufactured by TAKEO

TABLE 1

| | Ink component | | Tg degrees C. | SP $[(cal/cm^3)^{0.5}]$ |
|---|---|---|---|---|
| Hollow resin particle | Hollow resin particle Z | Hollow resin particle including styrene-acrylic copolymer | | 8.0 |
| | Hollow resin particle A | Hollow resin particle including styrene-acrylic copolymer | | 9.0 |
| | Hollow resin particle B | Hollow resin particle including methylmethacrylate resin | | 9.5 |
| | Hollow resin particle C | Hollow resin particle including phenol resin | | 11.0 |
| Organic solvent | Organic solvent A | Glycerin | | 17.4 |
| | Organic solvent B | 1,2-Propane diol | | 14.3 |
| | Organic solvent C | 1,2-butane diol | | 13.1 |
| | Organic solvent D | 3-ethyl-3-hydroxymethyl oxetane | | 11.0 |
| | Organic solvent E | 3-methoxy-N,N-dimethyl propoxyamide | | 9.2 |
| Resin | Acrylic silicone resin A | W4732 manufactured by TOYOCHEM CO., LTD. | 45 | 8.0 |
| | Acrylic silicone resin B | W5348 manufactured by TOYOCHEM CO., LTD. | 29 | 9.4 |
| | Acrylic silicone resin C | RKP-02 manufactured by TOYOCHEM CO., LTD. | −7 | 10.0 |
| | Acrylic silicone resin D | KP-543, manufactured by Shin-Etsu Chemical Co., Ltd.): | 30 | 7.5 |
| | Urethane resin | UWS145 manufactured by Sanyo Chemical Industries, Ltd. | −45 | 20.0 |
| Wax | Polyethylene-based wax emulsion (HYTEC E-6500 manufactured by TOHO Chemical Industry Co., Ltd.) | | | |
| Surfactant | Silicone-based surfactant (KF-640, manufactured by Shin-Etsu Chemical Co., Ltd.) | | | |
| Defoaming agent | Polyether-modified silicone oil (KF-353, manufactured by Shin-Etsu Chemical Co., Ltd.) | | | |
| Antibacterial Agent | PROXEL LV(S) manufactured by AVECIA GROUP | | | |
| pH regulator | 2-amino-2-ethyl-1,3-Propane diol | | | |
| Water | Deionized water | | | 23.3 |

Preparation of Ink

Examples 1 to 10 and Comparative Examples 1 to 6

The organic solvent, surfactant, defoaming agent, pH regulator, antibacterial agent, and water shown in Table 2

Co., Ltd.) in an amount of 2.1 mg/cm$^2$ and dried at 90 degrees C. for 60 seconds. At the time of printing with ink multiple times, printing and drying were repeated accordingly.

The print chart used was a square image of 3 cm×3 cm formed with dot patterns.

This was determined as the print sample.

Properties of the print sample of the solid image of 3 cm×3 cm formed with the dot patterns were evaluated according to the following methods.

Permeation Depth of Hollow Particle

Cross sections of the print sample of the solid image of 3 cm×3 cm formed with dot patterns were cut by a cutter. The cross section was observed with a scanning electron microscope (SEM) (JSL-6510A, manufactured by JEOL Ltd.) to measure the permeation thickness of the coloring material (hollow particle).

Luminosity of Print Sample

Luminosity of the solid portion of the solid image of 3 cm×3 cm formed with dot patterns was measured by using a spectrophotometric densitometer (939, manufactured by X-Rite).

The evaluation results of the white ink of Examples and Comparative Examples are shown in Tables 2 and 3. The values shown in the recipes in Tables 2 and 3 represent mixing ratio (percent by mass) of each component.

TABLE 2

| | | | Example 1 | Example 2 | Example 3 | Example 4 | Example 5 |
|---|---|---|---|---|---|---|---|
| Recipe | Coloring material | Hollow resin particle Z (SP: 8.0) | | | | | |
| | | Hollow resin particle A (SP: 9.0) | 10.00 | | | | |
| | | Hollow resin particle B (SP: 9.5) | | | | | 10.00 |
| | | Hollow resin particle C (SP: 11.0) | | 10.00 | 10.00 | 10.00 | |
| | | Titanium Oxide | | | | | |
| | Water-soluble organic solvent | Organic solvent A (SP: 17.4) | 3.00 | 3.00 | 3.00 | 3.00 | 3.00 |
| | | Organic solvent B (SP: 14.3) | 20.00 | 20.00 | 20.00 | 20.00 | 20.00 |
| | | Organic solvent C (SP: 13.1) | 10.00 | 10.00 | 10.00 | 10.00 | 10.00 |
| | | Organic solvent D (SP: 11.0) | | | | | |
| | | Organic solvent E (SP: 9.2) | | | | | |
| | Resin | Acrylic silicone resin A (SP: 8.0, Tg: 45 degrees C.) | 2.00 | 2.00 | | | 2.00 |
| | | Acrylic silicone resin B (SP: 9.4, Tg: 30 degrees C.) | | | 2.00 | | |
| | | Acrylic silicone resin C (SP: 10.0, Tg: −7 degrees C.) | | | | 2.00 | |
| | | Acrylic silicone resin D (SP: 7.5, Tg: 30 degrees C.) | | | | | |
| | | Urethane resin (SP: 20, Tg: −45 degrees C.) | | | | | |
| | WAX | HTEC E-6500 | 1.00 | 1.00 | 1.00 | 1.00 | 1.00 |
| | Surfactant | KF-640 | 0.50 | 0.50 | 0.50 | 0.50 | 0.50 |
| | Defoaming agent | KF-353 | 0.75 | 0.75 | 0.75 | 0.75 | 0.75 |
| | Antibacterial Agent | LV | 0.10 | 0.10 | 0.10 | 0.10 | 0.10 |
| | pH regulator | 2-amino-2-ethyl-1,3-propane diol | 0.20 | 0.20 | 0.20 | 0.20 | 0.20 |
| | Water | Deionized water (SP: 23.4) | 52.45 | 52.45 | 52.45 | 52.45 | 52.45 |
| | | Total | 100.00 | 100.00 | 100.00 | 100.00 | 100.00 |
| Evaluation Results | Resin SP | SP of hollow resin particle | 9.0 | 11.0 | 11.0 | 11.0 | 9.5 |
| | | SP of acrylic silicone resin | 8.0 | 8.0 | 9.4 | 10.0 | 8.0 |
| | | Difference of SPs | 1.0 | 3.0 | 1.6 | 1.0 | 1.5 |
| | Glass transition temperature (degrees C.) | Tg of acrylic silicone resin | 45.0 | 45.0 | 30.0 | −45.0 | 45.0 |
| | Luminosity L* | TANT (3 seconds) | 59.8 | 61.3 | 61.1 | 54.3 | 57.5 |
| | | Plike black (117 seconds) | 76.6 | 79.9 | 77.3 | 74.7 | 74.7 |

TABLE 2-continued

|  |  |  |  |  |  |  |  |
|---|---|---|---|---|---|---|---|
|  | Permeation depth (μm) | TANT (3 seconds) | 21.1 | 19.9 | 16.1 | 25.6 | 23.0 |
|  |  | Plike black (117 seconds) | 7.6 | 4.9 | 7.0 | 9.1 | 9.1 |
|  | Solvent SP | Mixture SP of water and organic solvent | 19.9 | 19.9 | 19.9 | 19.9 | 19.9 |
|  |  | SP of organic solvent contained most | 14.3 | 14.3 | 14.3 | 14.3 | 14.3 |

|  |  |  | Example 6 | Example 7 | Example 8 | Example 9 | Example 10 |
|---|---|---|---|---|---|---|---|
| Recipe | Coloring material | Hollow resin particle Z (SP: 8.0) |  |  |  |  | 10.00 |
|  |  | Hollow resin particle A (SP: 9.0) |  | 10.00 | 10.00 |  |  |
|  |  | Hollow resin particle B (SP: 9.5) | 10.00 |  |  |  |  |
|  |  | Hollow resin particle C (SP: 11.0) |  |  |  | 10.00 |  |
|  |  | Titanium Oxide |  |  |  |  |  |
|  | Water-soluble organic solvent | Organic solvent A (SP: 17.4) | 3.00 | 3.00 | 3.00 | 3.00 | 3.00 |
|  |  | Organic solvent B (SP: 14.3) | 20.00 | 20.00 | 20.00 | 20.00 | 20.00 |
|  |  | Organic solvent C (SP: 13.1) | 10.00 | 10.00 | 10.00 | 10.00 | 10.00 |
|  |  | Organic solvent D (SP: 11.0) |  |  |  |  |  |
|  |  | Organic solvent E (SP: 9.2) |  |  |  |  |  |
|  | Resin | Acrylic silicone resin A (SP: 8.0, Tg: 45 degrees C.) | 1.50 | 2.00 | 2.00 |  |  |
|  |  | Acrylic silicone resin B (SP: 9.4, Tg: 30 degrees C.) | 0.50 |  |  |  |  |
|  |  | Acrylic silicone resin C (SP: 10.0, Tg: −7 degrees C.) |  |  |  |  |  |
|  |  | Acrylic silicone resin D (SP: 7.5, Tg: 30 degrees C.) |  |  |  | 2.00 | 2.00 |
|  |  | Urethane resin (SP: 20, Tg: −45 degrees C.) |  |  |  |  |  |
|  | WAX | HTEC E-6500 | 1.00 | 1.00 |  | 1.00 | 1.00 |
|  | Surfactant | KF-640 | 0.50 |  | 0.50 | 0.50 | 0.50 |
|  | Defoaming agent | KF-353 | 0.75 |  | 0.75 | 0.75 | 0.75 |
|  | Antibacterial Agent | LV | 0.10 | 0.10 | 0.10 | 0.10 | 0.10 |
|  | pH regulator | 2-amino-2-ethyl-1,3-propane diol | 0.20 | 0.20 | 0.20 | 0.20 | 0.20 |
|  | Water | Deionized water (SP: 23.4) | 52.45 | 53.70 | 53.45 | 52.45 | 52.45 |
|  |  | Total | 100.00 | 100.00 | 100.00 | 100.00 | 100.00 |
| Evaluation Results | Resin SP | SP of hollow resin particle | 9.5 | 9.0 | 9.0 | 11.0 | 8.0 |
|  |  | SP of acrylic silicone resin | 8.4 | 8.0 | 8.0 | 7.5 | 7.5 |
|  |  | Difference of SPs | 1.2 | 1.0 | 1.0 | 3.5 | 0.5 |
|  | Glass transition temperature (degrees C.) | Tg of acrylic silicone resin | 41.3 | 45.0 | 45.0 | 30.0 | 30.0 |
|  | Luminosity L* | TANT (3 seconds) | 56.8 | 65.5 | 57.3 | 69.8 | 70.3 |
|  |  | Plike black (117 seconds) | 74.3 | 79.1 | 74.1 | 85.0 | 85.3 |
|  | Permeation depth (μm) | TANT (3 seconds) | 23.5 | 16.5 | 23.1 | 13.1 | 12.6 |
|  |  | Plike black (117 seconds) | 9.4 | 5.5 | 9.6 | 0.8 | 0.5 |

TABLE 2-continued

|  |  |  |  |  |  |  |
|---|---|---|---|---|---|---|
| Solvent SP | Mixture SP of water and organic solvent | 19.9 | 19.9 | 19.9 | 19.9 | 19.9 |
|  | SP of organic solvent contained most | 14.3 | 14.3 | 14.3 | 14.3 | 14.3 |

TABLE 3

|  |  |  | Comparative Example 1 | Comparative Example 2 | Comparative Example 3 |
|---|---|---|---|---|---|
| Recipe | Coloring material | Hollow resin particle Z (SP: 8.0) |  |  |  |
|  |  | Hollow resin particle A (SP: 9.0) |  | 10.00 | 10.00 |
|  |  | Hollow resin particle B (SP: 9.5) |  |  |  |
|  |  | Hollow resin particle C (SP: 11.0) |  |  |  |
|  |  | Titanium Oxide |  |  |  |
|  | Water-soluble organic solvent | Organic solvent A (SP: 17.4) | 3.00 | 3.00 | 3.00 |
|  |  | Organic solvent B (SP: 14.3) | 20.00 | 20.00 | 20.00 |
|  |  | Organic solvent C (SP: 13.1) | 10.00 | 10.00 | 10.00 |
|  |  | Organic solvent D (SP: 11.0) |  |  |  |
|  |  | Organic solvent E (SP: 9.2) |  |  |  |
|  | Resin | Acrylic silicone resin A (SP: 8.0, Tg: 45 degrees C.) | 2.00 |  |  |
|  |  | Acrylic silicone resin B (SP: 9.4, Tg: 30 degrees C.) |  |  |  |
|  |  | Acrylic silicone resin C (SP: 10.0, Tg: −7 degrees C.) |  |  |  |
|  |  | Acrylic silicone resin D (SP: 7.5, Tg: 30 degrees C.) |  |  |  |
|  |  | Urethane resin (SP: 20, Tg: −45 degrees C.) |  |  | 2.00 |
|  | WAX | HTEC E-6500 | 1.00 | 1.00 | 1.00 |
|  | Surfactant | KF-640 | 0.50 | 0.50 | 0.50 |
|  | Defoaming agent | KF-353 | 0.75 | 0.75 | 0.75 |
|  | Antibacterial Agent | LV | 0.10 | 0.10 | 0.10 |
|  | pH regulator | 2-amino-2-ethyl-1,3-propane diol | 0.20 | 0.20 | 0.20 |
|  | Water | Deionized water (SP: 23.4) | 62.45 | 54.45 | 52.45 |
|  |  | Total | 100.00 | 100.00 | 100.00 |
| Evaluation Results | Resin SP | SP of hollow resin particle | — | 9.0 | 9.0 |
|  |  | SP of acrylic silicone resin D | 8.0 | — | 20.0 |
|  |  | Difference of SPs | — | — | −11.0 |

TABLE 3-continued

|   |   |   |   |   |   |
|---|---|---|---|---|---|
| Glass Transition Temperature (degrees C.) | Tg of acrylic silicone resin D | 45.0 | — | — |   |
| Luminosity L* | TANT (3 seconds) | 23.5 | 48.2 | 49.5 |   |
|   | Plike black (117 seconds) | 23.5 | 67.1 | 68.1 |   |
| Permeation depth (μm) | TANT (3 seconds) | — | 30.5 | 29.4 |   |
|   | Plike black (117 seconds) | — | 15.2 | 14.4 |   |
| Solvent SP | Mixture SP of water and organic solvent | 20.2 | 19.9 | 19.9 |   |
|   | SP of organic solvent contained most | 14.3 | 14.3 | 14.3 |   |

|   |   |   | Comparative Example 4 | Comparative Example 5 | Comparative Example 6 |
|---|---|---|---|---|---|
| Recipe | Coloring material | Hollow resin particle Z (SP: 8.0) |   |   |   |
|   |   | Hollow resin particle A (SP: 9.0) | 10.00 | 10.00 |   |
|   |   | Hollow resin particle B (SP: 9.5) |   |   |   |
|   |   | Hollow resin particle C (SP: 11.0) |   |   |   |
|   |   | Titanium Oxide |   |   | 10.00 |
|   | Water-soluble organic solvent | Organic solvent A (SP: 17.4) | 3.00 |   | 3.00 |
|   |   | Organic solvent B (SP: 14.3) | 20.00 |   | 20.00 |
|   |   | Organic solvent C (SP: 13.1) | 10.00 | 10.00 | 10.00 |
|   |   | Organic solvent D (SP: 11.0) |   | 10.00 |   |
|   |   | Organic solvent E (SP: 9.2) |   | 25.00 |   |
|   | Resin | Acrylic silicone resin A (SP: 8.0, Tg: 45 degrees C.) |   |   | 2.00 |
|   |   | Acrylic silicone resin B (SP: 9.4, Tg: 30 degrees C.) |   |   |   |
|   |   | Acrylic silicone resin C (SP: 10.0, Tg: −7 degrees C.) | 2.00 | 2.00 |   |
|   |   | Acrylic silicone resin D (SP: 7.5, Tg: 30 degrees C.) |   |   |   |
|   |   | Urethane resin (SP: 20, Tg: −45 degrees C.) |   |   |   |
|   | WAX | HTEC E-6500 | 1.00 | 1.00 | 1.00 |
|   | Surfactant | KF-640 | 0.50 | 0.50 | 0.50 |
|   | Defoaming agent | KF-353 | 0.75 | 0.75 | 0.75 |
|   | Antibacterial Agent | LV | 0.10 | 0.10 | 0.10 |
|   | pH regulator | 2-amino-2-ethyl-1,3-propane diol | 0.20 | 0.20 | 0.20 |

TABLE 3-continued

| | | | | |
|---|---|---|---|---|
| Water | Deionized water (SP: 23.4) | 52.45 | 40.45 | 52.45 |
| | Total | 100.00 | 100.00 | 100.00 |
| Evaluation Results | Resin SP | SP of hollow resin particle | 9.0 | 9.0 | — |
| | | SP of acrylic silicone resin D | 10.0 | 10.0 | 8.0 |
| | | Difference of SPs | −1.0 | −1.0 | — |
| | Glass Transition Temperature (degrees C.) | Tg of acrylic silicone resin D | −45.0 | −45.0 | 45.0 |
| | Luminosity L* | TANT (3 seconds) | 47.2 | 26.7 | 33.3 |
| | | Plike black (117 seconds) | 67.6 | 28.2 | 62.2 |
| | Permeation depth (μm) | TANT (3 seconds) | 31.3 | — | 55.0 |
| | | Plike black (117 seconds) | 14.8 | — | 24.3 |
| | Solvent SP | Mixture SP of water and organic solvent | 19.9 | 16.6 | 19.9 |
| | | SP of organic solvent contained most | 14.3 | 9.2 | 14.3 |

It was not possible to demonstrate the target luminosity when printing was conducted on a substrate having a low smoothness with white ink because the coloring material component in the ink had permeated into the substrate. This was significant when a titanium oxide (coloring material) having a small particle diameter in comparison with the hollow resin particle was used. The luminosity was closer to the target value when the hollow resin particle was used instead of titanium oxide but failed to secure a sufficient level.

According to the present disclosure, a white ink is provided which demonstrates a target luminosity on a substrate (print medium) having a low smoothness.

Having now fully described embodiments of the present invention, it will be apparent to one of ordinary skill in the art that many changes and modifications can be made thereto without departing from the spirit and scope of embodiments of the invention as set forth herein.

What is claimed is:

1. A white ink comprising:
a hollow resin particle;
an organic solvent;
an acrylic silicone resin; and
water,
wherein the acrylic silicone resin has a resin solubility parameter smaller than a resin solubility parameter of the hollow resin particle,
wherein an amount of the hollow resin particles in the white ink is from 8.5 to 10% by mass, based on the white ink,
wherein the resin solubility parameter of the hollow resin particle is 9 to 11 $(cal/cm^3)^{0.5}$, and
wherein the resin solubility parameter of the acrylic silicone resin is 8 to 10 $(cal/cm^3)^{0.5}$.

2. The white ink according to claim 1, wherein the resin solubility parameter of the hollow resin particle and the resin solubility parameter of the acrylic silicone resin have a difference of 1 to 3 $(cal/cm^3)^{0.5}$.

3. The white ink according to claim 1, wherein the acrylic silicone resin has a glass transition temperature of 30 degrees C. or higher.

4. The white ink according to claim 1, wherein the hollow resin particle includes one of a styrene and acrylic copolymer, a methylmethacrylate resin, and a phenol resin.

5. The white ink according to claim 1, wherein the white ink has a luminosity of L* or higher at an attached amount of the white ink of 2.1 mg/cm$^2$ on a substrate, where L* is represented by the following relation:

$$L^* = 0.2 \times \text{smoothness (seconds) of the substrate} + 50,$$

wherein the smoothness is measured by an Oken smoothness tester.

6. The white ink according to claim 1, wherein the organic solvent is at least one selected from the group consisting of glycerin, 1,2-propanediol, 1,2-butanediol, 3-ethyl-3-hydroxymethyl oxetane, and 3-methoxy-N,N-dimethyl propoxyamide.

7. The white ink according to claim 1, wherein the hollow resin particles are present in an amount of 10% by mass;
wherein the substrate is paper;
wherein the solubility parameter of the hollow resin particles is from 9.0 to 11.0;
wherein the organic solvent is at least one selected from the group consisting of glycerin, 1,2-propanediol, 1,2-butanediol, 3-ethyl-3-hydroxylmethyl oxetane and 3-methoxy-N,N-dimethyl propoxyamide;
wherein the organic solvent is present in an amount of 33% by weight;
the solubility parameter of the acrylic silicone resin is from 8.0 to 10.0;
the acrylic silicon resin is present in an amount of 2% by mass;
wherein the white ink further comprises a wax in an amount of 1% by mass,
a surfactant in an amount of 0.5% by mass,
a defoaming agent in an amount of 0.75% by mass,
an antibacterial agent in an amount of 0.1 by mass, a pH regulator in an amount of 0.2% by mass, and water in an amount of from 52.45 to 53.7% by mass; and wherein the difference in the solubility parameter between the hollow resin particle and the acrylic silicone resin is from 1 to 3.

8. The white ink according to claim 1, wherein the acrylic silicone resin has a $T_g$ of 30-45° C.

9. The white ink according to claim 1, having a luminosity (TANT-3 seconds) of from 54.3 to 61.3.

10. Printed matter comprising:
    a substrate having a smoothness of 120 seconds or less as measured by an Oken smoothness tester; and
    a white printed layer including a hollow resin particle, an organic solvent, and acrylic silicone resin,
    wherein the acrylic silicone resin has a resin solubility parameter smaller than a resin solubility parameter of the hollow resin particle,
    wherein the resin solubility parameter of the hollow resin particle is 9 to 11 $(cal/cm^3)^{0.5}$, and
    wherein the resin solubility parameter of the acrylic silicone resin is 8 to 10 $(cal/cm^3)^{0.5}$, and
    wherein the hollow resin particle has a permeation depth of 1 to 25 μm to the substrate.

11. The printed matter according to claim 10, wherein the substrate is paper and the acrylic silicone resin is preferentially permeated into the substrate in comparison to the hollow resin particle.

12. The printed matter of claim 10, wherein the substrate is paper and the hollow resin particles have a permeation depth in the paper (TANT-3 seconds) of from 16.1 to 25 μm.

13. A method of printing comprising:
    applying the white ink of claim 1 to a substrate.

14. The method according to claim 13, wherein the substrate has a smoothness of 120 seconds or less, measured by an Oken smoothness tester.

15. A device for printing, comprising:
    an ink accommodating unit configured to accommodate an ink including the white ink of claim 1; and
    an ink discharging head configured to discharge the ink.

* * * * *